United States Patent
Kumar et al.

(10) Patent No.: US 7,007,271 B2
(45) Date of Patent: Feb. 28, 2006

(54) METHOD AND APPARATUS FOR INTEGRATED INSTRUCTION SCHEDULING AND REGISTER ALLOCATION IN A POSTOPTIMIZER

(75) Inventors: Anoop Kumar, Mountain View, CA (US); Sreekumar Ramakrishnan Nair, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 688 days.

(21) Appl. No.: 10/124,906

(22) Filed: Apr. 18, 2002

(65) Prior Publication Data

US 2003/0200540 A1     Oct. 23, 2003

(51) Int. Cl.
   *G06F 9/45* (2006.01)
(52) U.S. Cl. .................. 717/151; 717/144; 717/156
(58) Field of Classification Search ........ 717/124–127, 717/139–146, 150–157, 162
See application file for complete search history.

(56) References Cited

U.S. PATENT DOCUMENTS

| | | | | |
|---|---|---|---|---|
| 5,202,975 A | * | 4/1993 | Rasbold et al. | 717/151 |
| 5,230,050 A | * | 7/1993 | Iitsuka et al. | 717/145 |
| 5,606,697 A | * | 2/1997 | Ono | 717/159 |
| 5,613,121 A | * | 3/1997 | Blainey | 717/151 |
| 5,790,874 A | * | 8/1998 | Takano et al. | 713/320 |
| 5,937,190 A | * | 8/1999 | Gregory et al. | 717/131 |
| 5,999,734 A | * | 12/1999 | Willis et al. | 717/149 |
| 6,031,994 A | * | 2/2000 | Radigan | 717/152 |
| 6,059,841 A | * | 5/2000 | Caracuzzo | 717/154 |
| 6,263,489 B1 | * | 7/2001 | Olsen et al. | 717/129 |
| 6,374,403 B1 | * | 4/2002 | Darte et al. | 717/161 |
| 6,631,514 B1 | * | 10/2003 | Le | 717/137 |
| 6,651,246 B1 | * | 11/2003 | Archambault et al. | 717/160 |
| 6,675,380 B1 | * | 1/2004 | McKinsey et al. | 717/161 |
| 6,711,728 B1 | * | 3/2004 | Otsubo | 716/18 |
| 6,718,541 B1 | * | 4/2004 | Ostanevich et al. | 717/149 |
| 6,751,792 B1 | * | 6/2004 | Nair | 717/161 |

OTHER PUBLICATIONS

Gupta et al, "Resource sensitive profile directed data flow analysis for code optimization", IEEE, pp 358-368, 1997.*
Ngassam et al, "Hardcoding finite state automata processing", ACM SAICSIT, pp 111-121, 2003.*
Jacobson et al, Achieving fast and exact hazard free logic minimization of extended burst mode gc finite state machine:, Proc. of IEEE/ACM Int. Conf. on CAD, pp 303-310, Nov. 2000.*
Moon et al, "A study on the number of memory ports inmultiple instruction issues machines", IEEE, pp 49-58, 1993.*

\* cited by examiner

*Primary Examiner*—Anil Khatri
(74) *Attorney, Agent, or Firm*—Zagorin O'Brien Graham LLP

(57) ABSTRACT

The present invention describes a method of efficiently optimizing instruction scheduling and register allocation in a post optimizer. The method removes false register dependencies between pipelined instructions by building an incremental (partial) interference graph of register allocation for scheduled instructions. False dependency graph indicates the amount of parallelism in the data flow graph. The incremental interference graph uses a mix of virtual and physical registers. The interference graph is built incrementally as an instruction schedular schedules each instruction. The optimization is done incrementally on localized code. The physical register mapping is maximized and virtual registers are created on demand basis.

120 Claims, 1 Drawing Sheet

METHOD AND APPARATUS FOR INTEGRATED INSTRUCTION SCHEDULING AND REGISTER ALLOCATION IN A POSTOPTIMIZER

BACKGROUND OF THE INVENTION

1. Field of the Invention

This invention relates to the field of software compilation and, and more particularly relates to post optimization of compiled code.

2. Description of the Related Art

Today's compilers include various schemes for code optimization. Generally, compilers produce relocatable object modules that can be linked together and loaded for execution by a link loader. The compilers can generate efficient instruction sets using target dependent or target independent machine codes. However, the code generated by a compiler may not be optimized for particular applications. Once an instruction set is generated by a compiler, the instruction set can further be optimized using various post-optimization techniques. Post-optimization of code involves re-visiting the generated code and finding an efficient way to execute the generated code. Some of the common techniques for post optimization include instruction scheduling and register allocation.

Instruction scheduling allows a compiler to identify code operations that are independent and can be executed out of sequence. For example, a routine for printing the status of idle peripheral devices can be executed ahead of a routine that is computing a complex mathematical algorithm as long as there are no data, resource or other related dependencies between the two routines.

In register allocation scheme, a compiler identifies and allocates available machine registers to store intermediate and final results of a computation. The number of actual hardware registers in a given machine is limited by the target machine architecture. A compiler's design may allow use of software virtual registers that are allocated memory locations, to be used for register operations. Initially, during code generation process, the compiler may assume an infinite number of available virtual registers and allocate virtual registers to various computations. However, each virtual register is eventually mapped to actual hardware registers for final code generation. Allowing a compiler to use unlimited number of virtual registers for code generation can produce an optimized instruction scheduling for a given code generation. Because each virtual register requires mapping with limited number of actual machine register, instruction scheduling can be limited.

The optimization of code generation can be improved by integrating instruction scheduling and register allocation. In integrated optimization, a balance between instruction scheduling and register allocation is achieved by accepting some inefficiency in instruction scheduling and some spillover register allocation of virtual registers. The current integrated optimization techniques include inefficient instruction scheduling and register allocation.

SUMMARY

In one embodiment, the present invention describes a method of integrated instruction scheduling and register allocation. The method includes selecting at least one instruction region and resolving resource constraints for one or more instructions in the instruction region using a finite state machine. The method further includes constructing a dependency graph for the instruction region. The method further includes computing one or more priority functions for instructions in the instruction region.

The method further includes determining whether all instructions in the instruction region require scheduling and if all instructions in the instruction region require scheduling, determining whether one or more of the machine resource require deferred renaming. The method further includes if one or more of the machine resource require deferred renaming, performing partial graph coloring. The method further includes if all instructions in the instruction region do not require scheduling, determining whether enough of the machine resources are available to schedule the first instruction. The method further includes if enough of the machine resources are not available to schedule one or more instructions in the instruction region, heuristically updating one or more of the priority functions for instructions in the instruction region, updating availability of the machine resources, and repeating the steps of determining.

The method further includes if enough of the machine resources are available to schedule one or more instructions in the instruction region, selecting a first instruction from the instruction region and scheduling the first instruction for execution. The method further includes determining whether the scheduling of the first instruction was successful and if the scheduling of the first instruction was successful, incrementally updating dependency graph, updating availability of the machine resources, and repeating the step of determining whether all instructions in the instruction region require scheduling.

The method further includes if the scheduling of the first instruction was not successful, determining whether the first instruction has false dependency on one or more of the physical registers. The method further includes if the first instruction does not have false dependency on one or more of the physical registers, repeating the step of determining whether all instructions in the instruction region require scheduling. The method further includes if the first instruction has false dependency on one or more of the physical registers, determining whether to use deferred renaming for one or more of the physical registers. The method further includes if deferred renaming for one or more of the physical registers is required, virtualizing one or more of the physical registers, incrementally updating dependency graph, updating availability of the machine resources, and repeating the step of determining whether all instructions in the instruction region require scheduling.

The method further includes if deferred renaming for one or more of the physical registers is not required, renaming one or more of the physical registers of the first instruction, incrementally updating dependency graph, updating availability of the machine resources, and repeating the step of determining whether all instructions in the instruction region require scheduling.

The method further includes changing a machine description table for the finite state machine to make the finite state machine retargetable for one or more target machines The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

Figure 1:
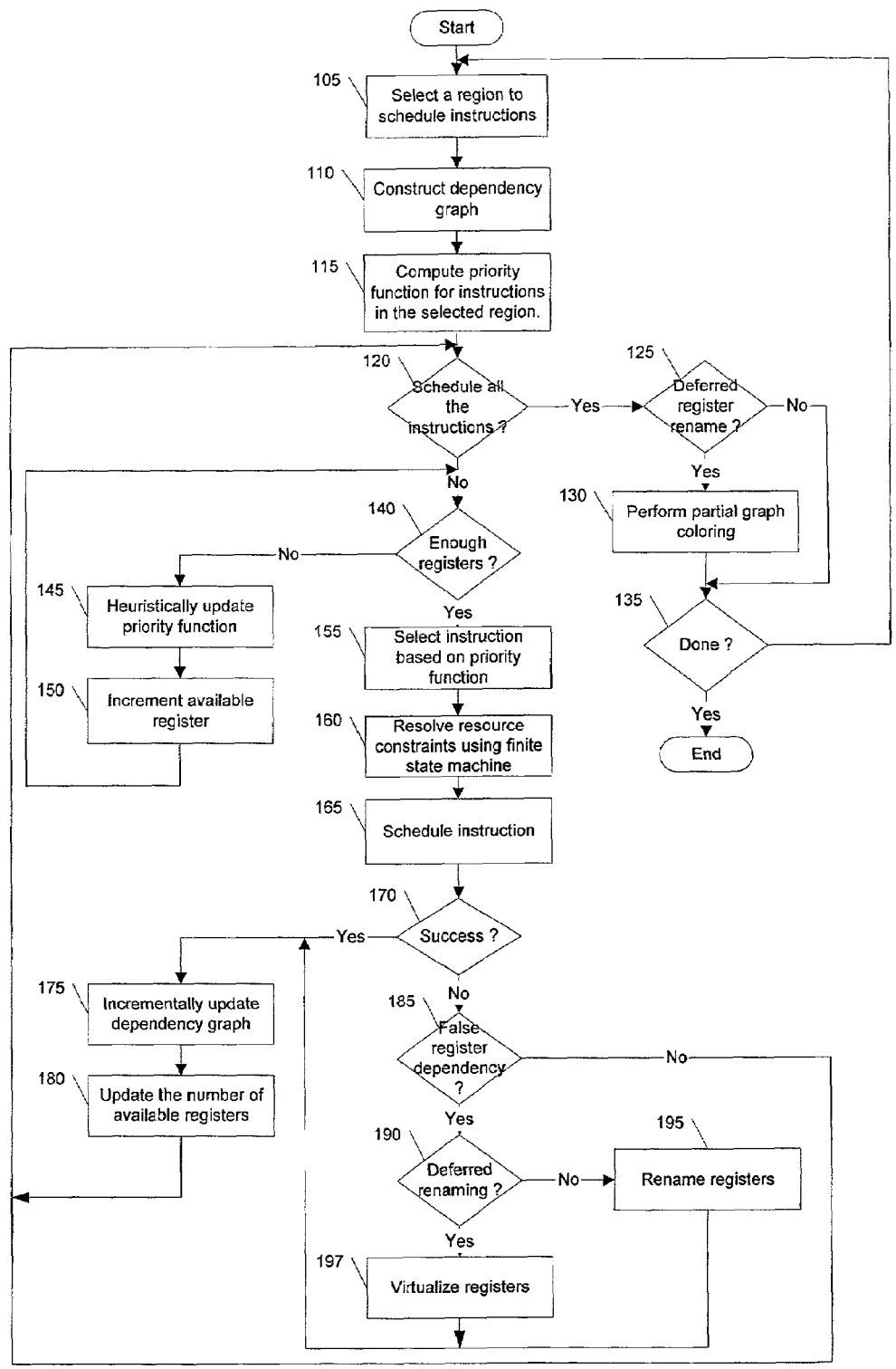
FIG. 1 illustrates steps performed during a process of integrated instruction scheduling and register allocation according to an embodiment of the present invention.

The following is intended to provide a detailed description of an example of the invention and should not be taken to be limiting of the invention itself. Rather, any number of variations may fall within the scope of the invention which is defined in the claims following the description.

Introduction

The present invention describes a method of efficiently optimizing instruction scheduling and register allocation in a post optimizer. The method removes false register dependencies between pipelined instructions by building an incremental (partial) interference graph of register allocation for scheduled instructions. False dependency graph indicates the amount of parallelism in the data flow graph. The false dependency graph is weighted based on depth along the critical path. The incremental interference graph uses a mix of virtual and physical registers. The interference graph is built incrementally as an instruction schedular schedules each instruction. The method optimizes the instructions scheduled by the instruction scheduler. The optimization is done incrementally on localized code. The physical register mapping is maximized and virtual registers are created on demand basis. A given set of instructions is optimally scheduled while maintaining the data dependencies of the application program and resource constraints imposed by the target architecture. The modeling of resource constraints is done using finite state automation. The method heuristically updates the priority functions of the instruction to maximize the used of physical registers of the target architecture.

Interference Graph

Typically, when a compiler generates an intermediate representation (IR) of code, the compiler assumes unlimited number of virtual registers for code execution. However, every processor has limited number of physical registers. A register allocator (RA) maps virtual registers used by the compiler to physical registers of the target machine. For the purposes of illustrations, consider a sequence of instructions shown in table 1.

TABLE 1

Example of a given set of instructions.

| # | Op-code | Operand | | Instruction Life Times | | | | |
|---|---|---|---|---|---|---|---|---|
| 1 | Add | %v1, %v2, %v3 | %v3 (A) | %v1 (B) | %v2 (C) | | | |
| 2 | Sll | %v3, 3, %v4 | | | | %v4 (D) | | |
| 3 | Mul | %v1, %v2, %v5 | | | | | %v5 (E) | |
| 4 | Add | %v5, 120, %v7 | | | | | | %v7 (F) |
| 5 | Ld | [%v5 + %v7], %v3 | %v3 (G) | | | | | |

TABLE 1-continued

Example of a given set of instructions.

| # | Op-code | Operand | Instruction Life Times | |
|---|---|---|---|---|
| 6 | Add | %v3, 100, %v5 | %v5 (H) | |
| 7 | Sub | %v4, %v5, %v7 | | %v7 (I) |

Where % v(n) is virtual register. There are nine instruction lifetimes, lifetimes A–I. Each lifetime is associated with a virtual register. Each lifetime is mapped to an available physical register of the target machine by a register allocator. The overlaps among the lifetimes for physical register allocation are known as interference. An interference graph identifies register constraints for a given set of instructions. The interference graph is used to generate register graph coloring to allocate an available machine register to each virtual register. The methods of generating interference graph and graph coloring based register allocation are known in the art. Table 2 shows the interference graph (IG) for the above sequence of instructions.

TABLE 2

Example of an interference graph.

| Node | Interference |
|---|---|
| A | B, C, D |
| B | A, C, D, E |
| C | A, B, D, E |
| D | A, B, C, E, G, H, I |
| E | B, C, D, F, G |
| F | D, E, G |
| G | D, E, F, H |
| H | D, G, I |
| I | D, H |

For illustration purposes, in the present example, six physical registers are available for the target machine. An IG with no more than 5 nodes can be colored with six registers. However, in the current example, graph D has edges to 7 nodes. Thus, graph D cannot be colored using six registers. The number of edges out of graph D needs to be reduced before the IG can be colored using six registers. A "spill" and a "reload" is used to shorten the lifetime of D. Table 3 shows an example of "spill" and "reload" used in the given set of instructions.

TABLE 3

Example of 'spill' and 'reload'.

| # | Op-code | Operand | | Instruction Life Times | | | | |
|---|---|---|---|---|---|---|---|---|
| 1 | add | %v1, %v2, %v3 | %v3 (A) | %v1 (B) | %v2 (C) | | | |
| 2 | sll | %v3, 3, %v4 | | | | %v4 (D) | | |
| 3 | mul | %v1, %v2, %v5 | | | | | %v5 (E) | |
| 3' | st | %v4, [temp] | | | | | | |
| 4 | add | %v5, 120, %v7 | | | | | | %v7 (F) |
| 5 | ld | [%v5 + %v7], %v3 | %v3 (G) | | | | | |

TABLE 3-continued

Example of 'spill' and 'reload'.

| # | Op-code | Operand | Instruction Life Times | |
|---|---------|---------|------------------------|---|
| 6 | add | %v3, 100, %v5 | | %v5 (H) |
| 6' | ld | [temp], %v4 | | %v4 (D') |
| 7 | sub | %v4, %v5, %v7 | | %v7 (I) |

In the above example, instruction 3' spills the value of register % v4 of lifetime D to a temporary location on a target machines stack 'temp1' and instruction 6' reloads the value from stack 'temp1' into % v4. Thus the lifetime D is broken into two lifetimes, D and D'. Table 4 shows the modified IG after 'spill' and 'reload'.

TABLE 4

Modified interference graph after 'spill' and 'reload.

| Node | Interference |
|------|--------------|
| A | B, C, D |
| B | A, C, D, E |
| C | A, B, D, E |
| D | A, B, C, E, |
| E | B, C, D, F, G |
| F | E, G |
| G | E, F, H |
| H | D', G, I |
| D' | H, I |
| I | D', H |

In the above example, the IG has been reduced to a register colorable graph for six registers. For the purposes of illustrations, there are six physical registers in the target machine, registers % r1–% r6. Table 5 shows an example of one possible coloring of the virtual registers to available physical registers.

TABLE 5

Example of a possible register coloring.

| Node | Interference |
|------|--------------|
| A (%r1) | B(%r2), C(%r3), D(%r4) |
| B (%r2) | A(%r1), C(%r3), D(%r4), E(%r5) |
| C (%r3) | A(%r1), B(%r2), D(%r4), E(%r5) |
| D (%r4) | A(%r1), B(%r2), C(%r3), E(%r5) |
| E (%r5) | B(%r2), C(%r3), D(%r4), F(%r1), G(%r6) |
| F (%r1) | E(%r5), G(%r6) |
| G (%r6) | E(%r5), F(%r1), H(%r1) |
| H (%r1) | D'(%r4), G(%r6), I(%r2) |
| D' (%r4) | H(%r1), I(%r2) |
| I (%r2) | D'(%r4), H(%r1) |

After the register coloring for 'spill' and 'reload', the physical register can be mapped to the given set of instructions. Table 6 shows an example of physical register mapping for the given set of instructions after the 'spill' and 'reload'.

TABLE 6

Example of physical register mapping after 'spill' and 'reload'.

| # | Op-code | Operand | Instruction Life Times | | | | | |
|---|---------|---------|---|---|---|---|---|---|
| 1 | add | %r2, %r3, %r1 | %r1 (A) | %r2 (B) | %r3 (C) | | | |
| 2 | sll | %r1, 3, %r4 | | | | %r4 (D) | | |
| 3 | mul | %r2, %r3, %r5 | | | | | %r5 (E) | |
| 3' | st | %r4, [temp1] | | | | | | |
| 4 | add | %r5, 120, %r1 | | | | | | %r1 (F) |
| 5 | ld | [%r5 + %r1], %r6 | %r6 (G) | | | | | |
| 6 | add | %r5, 120, %r1 | | | | | | %v5 (H) |
| 6' | ld | [temp1], %r4 | | | | %r4 (D') | | |
| 7 | sub | %r4, %r1, %r2 | | | | | | %r2 (I) |

Incremental Interference Graph

The interference graphs in the aforementioned examples included the virtual registers. Using virtual registers, the register graph coloring becomes increasingly difficult especially, when the available physical register for the target machine are limited. In one embodiment of the present invention, a modified interference graph with a mix of virtual and physical registers is used. The edges of the interference graph that connect to virtual registers are used for 'spill' and 'reload'. The interference graph is built incrementally as the instruction schedular schedules each instruction. Partial register coloring is performed using incremental interference graph.

According to an embodiment of the present invention, instructions are optimized by focusing on the instruction schedule and register allocation on a localized code. Because the optimization is done on a localized code, much of the physical register mappings as identified by the code generator is retained and number of virtual registers are fewer compared to the number of physical registers. The virtual registers are created on a demand-based virtualization. The incremental optimization on localized code generates code faster under stringent conditions (e.g., during runtime binary optimization).

Construction of an Incremental Interference Graph

Generally, instruction scheduler can schedule instructions using forward scheduling or backward scheduling. The instruction scheduler (IS) schedules instructions using a bucket of instructions connected by a data flow order. In forward scheduling, the IS first picks the best instruction to fill the first slot in the basic block, then picks the next best instruction for the second slot in the basic block and so on until all the instructions are scheduled. In backward scheduling, the IS picks up the best instructions to fill the last (ultimate) slot in the basic block and then picks the best instruction to fill the penultimate slot in the basic block and so on.

For the purposes of illustration, in the present example, backward scheduling for basic block is used. However, one skilled in art will appreciate that similar principles can be applied to forward scheduling, inter-basic blocks and global instruction sets. In the present example, the instruction set given in table 6 with physical registers is used.

Initially, using backward scheduling, instruction seven is assigned to the last (ultimate) slot of the basic block. Table 7 illustrates the basic block after the first instruction assignment.

TABLE 7

Example of basic block after first instruction assignment.

| # | Opcode | Operand | Instruction Life Times | | |
|---|---|---|---|---|---|
| 7 | sub | %r4, %r1, %r2 | %r2 (A) | %r4 (B) | %r5 (C) |

Based on the data dependency information for instruction seven, the interference graph built by the instruction schedular is illustrated in table 8.

TABLE 8

Example of interference graph for the basic block.

| Node | Interference |
|---|---|
| A | B, C |
| B | A, C |
| C | A, B |

Next, the 'spill' and 'reload' can be eliminated by moving instruction two next to instruction seven. However, the value of register %r1 (defined by instruction six) is not what is needed in instruction two, instead the value of register %r1 defined by instruction 1 is required by the code. Thus, the instance of register %r1 'demands' virtualization. The instruction scheduler virtualizes register %r1 to a virtual register %v1. This is demand based virtualization, that is, the registers are virtualized when the instruction scheduler cannot proceed with instruction scheduling without introducing an error. Table 9 illustrates an example of 'virtualized' code.

TABLE 9

Example of virtualized code.

| # | Opcode | Operand | Instruction Life Times | | | |
|---|---|---|---|---|---|---|
| 2 | sll | %v1, 3, %r4 | | | | %v1 (D) |
| 7 | sub | %r4, %r1, %r2 | %r2 (A) | %r4 (B) | %r5 (C) | |

Next, the instruction schedular develops the interference graph. Table 10 illustrates an example of the interference graph for the virtualized code of table 9.

TABLE 10

Example of interference graph for virtualized code.

| Node | Interference |
|---|---|
| A | B, C |
| B | A, C |
| C | A, B |
| D | B, C |

For purposes of illustrations, remaining instructions are not reordered. However, one skilled in the art will appreciate that a given set of instructions can be reordered multiple times to obtained optimized code. Next, the instruction schedular assigns remaining instructions to the basic block. Table 11 illustrates an example of the assignment of the given code.

TABLE 11

Example of the register assignment for the given code.

| # | Opcode | Operand | Instruction Life Times | | | |
|---|---|---|---|---|---|---|
| 1 | add | %r2, %r3, %v1 | | | | |
| 3 | mul | %r2, %r3, %r5 | %r2 (H) | %r3 (I) | | |
| 4 | add | %r5, 120, %r1 | | | | |
| 5 | ld | [%r5 + %r1], %r6 | | %r4 (F) | %r5 (G) | |
| 6 | add | %r6, 100, %r1 | %r6 (E) | | | |
| 2 | sll | %v1, 3, %r4 | | | | %v1 (D) |
| 7 | sub | %r4, %r1, %r2 | %r2 (A) | %r4 (B) | %r1 (C) | |

The interference graph for the instruction set of table 11 is illustrated in table 12.

TABLE 12

Example of interference graph.

| Node | Interference |
|---|---|
| A | B, C |
| B | A, C, D |
| C | A, B, D, E |
| D | B, C, E, F, G, H, I |
| E | C, D, F, G |
| F | D, E, G |
| G | D, E, F, H, I |
| H | D, G, I |
| D' | D, H, I |
| I | D, G, H |

As illustrated in table 12, node D has seven life times, However, in the present example, the target machine has six physical registers. Thus, the instruction schedular generates a 'spill' and 'reload' for register %v1. Table 13 illustrates an example of 'spill' and 'reload' for the code.

TABLE 13

Example of 'spill' and 'reload' for the given code.

| # | Opcode | Operand | Instruction Life Times | | | |
|---|---|---|---|---|---|---|
| 1 | Add | %r2, %r3, %v1 | | | | |
| 1' | St | %v1, [temp2] | | | | %v1 (D) |
| 3 | Mul | %r2, %r3, %r5 | %r2 (H) | %r3 (I) | | |
| 4 | Add | %r5, 120, %r1 | | | | |
| 5 | Ld | [%r5 + %r1], %r6 | | %r1 (F) | %r5 (G) | |
| 6 | Add | %r6, 100, %r1 | %r6 (E) | | | |
| 6' | Ld | [temp2], %v1 | | | | |
| 2 | Sll | %v1, 3, %r4 | | | | %v1 (D') |

TABLE 13-continued

Example of 'spill' and 'reload' for the given code.

| # | Opcode | Operand | Instruction Life Times | | |
|---|--------|---------|------|------|------|
| 7 | Sub | %r4, %r1, %r2 | %r2 | %r4 | %r1 |
|   |     |                | (A)  | (B)  | (C)  |

An example of the interface graph generated by the instruction schedular is illustrated in table 14.

TABLE 14

Example of interference graph for 'spill' and 'reload'.

| Node | Interference |
|------|--------------|
| A | B, C |
| B | A, C, D' |
| C | A, B, D', E |
| D' | B, C |
| E | C, F, G |
| F | E, G |
| G | E, F, H, I |
| D | H, I |
| H | D, G, I |
| I | D, G, H |

Partial Graph Coloring

Generally, in conventional interference graph, register allocator colors the complete interference graph. However, in incremental interference graph, most of the registers are physical registers and are not reallocated. Thus, in incremental interference graph, the register allocator functions on the nodes corresponding to the lifetimes of virtual registers and determines the appropriate physical register mapping for the virtual registers. In the forgoing example, all the registers except % v1 in lifetime D and D' are all physical registers. Thus the register allocator allocates only one register during partial graph coloring. The partial register graph coloring for aforementioned example is illustrated in table 15.

TABLE 15

Example of partial register graph coloring.

| Node | Interference |
|------|--------------|
| A (%r2) | B(%r4), C(%r1) |
| B (%r4) | A(%r2), C(%r1), D'(%v1) |
| C (%r1) | A(%r2), B(%r4), D'(%v1), E(%r6) |
| D' (%v1) | B(%r4), C(%r1) |
| E (%r6) | C(%r1), F(%r1), G(%r5) |
| F (%r1) | E(%r6), G(%r5) |
| G (%r5) | E(%r6), F(%r1), H(%r2), I(%r3) |
| D (%v1) | H(%r2), I(%r3) |
| H (%r2) | D(%v1), G(%r5), I(%r3) |
| I (%r3) | D(%v1), G(%r5), H(%r2) |

Next, the register allocator identifies one possible mapping for D and D' with physical registers and generates the final register graph coloring for the present example as illustrated in table 16.

TABLE 16

Example of final register graph coloring.

| Node | Interference |
|------|--------------|
| A (%r2) | B(%r4), C(%r1) |
| B (%r4) | A(%r2), C(%r1), D'(%r3) |
| C (%r1) | A(%r2), B(%r4), D'(%r3), E(%r6) |
| D' (%r3) | B(%r4), C(%r1) |
| E (%r6) | C(%r1), F(%r1), G(%r5) |
| F (%r1) | E(%r6), G(%r5) |
| G (%r5) | E(%r6), F(%r1), H(%r2), I(%r3) |
| D (%r1) | H(%r2), I(%r3) |
| H (%r2) | D(%r1), G(%r5), I(%r3) |
| I (%r3) | D(%r1), G(%r5), H(%r2) |

The final code with physical register binding is illustrated in table 17.

TABLE 17

Final code generated for the given set of instructions.

| # | Opcode | Operand | Instruction Life Times | | | |
|---|--------|---------|------|------|------|------|
| 1 | add | %r2, %r3, %r1 | | | | |
| 1' | st | %r1, [temp2] | | | | %r1 (D) |
| 3 | mul | %r2, %r3, %r5 | %r2 (H) | %r3 (I) | | |
| 4 | Add | %r5, 120, %r1 | | | | |
| 5 | Ld | [%r5 + %r1], %r6 | | | %r4 (F) | %r5 (G) |
| 6 | Add | %r6, 100, %r1 | %r6 (E) | | | |
| 6' | Ld | [temp2], %r1 | | | | |
| 2 | Sll | %r1, 3, %r4 | | | | %r1 (D') |
| 7 | Sub | %r4, %r1, %r2 | %r2 (A) | %r4 (B) | %r1 (C) | |

Retargetable Finite State Automata

Generally, the instruction scheduler determines the optimal schedule for a given sequence of instructions. The instruction schedular maintains the data dependencies imposed by the program and resource constraints imposed by the target architecture. According to an embodiment of the present invention, a retargetable finite state automata (FSA) is used to model resource constraints of the target machine. The FSA determines whether given a target machine and a partial code schedule, a new instruction can be placed in a time 't' without any resource conflict. Time required with this determination is one operation cycle.

Algorithm

Following is an example of an algorithm according to an embodiment of the present invention.

parse_machine_description_file( ){

```
// This routine parses the machine description file, and constructs collision matrix for
each instruction class.
}
int
get_transition_state(int state_index,int insn_class_index){
//This routine ORs the matrix(state_index) with the collision matrix of instruction
class insn_class_index.
}
int
cycle_advance(int index){
    // This routine shifts all rows of the given matrix (indicated by index) by one.
}
construct_automata(int state_index){
    if(finite_states[state_index] != VISITED){
        finite_states[state_index] = VISITED;
        for(i=0; i < no_of_insn_classes; i++){
            transition_index = get_transition_state(state_index,i);
            transition_table[(state_index*(no_of_insn_classes+1))+i] =
                            transition_index;
            if(transition_index != INVALID_INDEX){
                construct_automata(transition_index);
            }
        }
    }
}
construct_automata_wrapper(){
    for(i=0; i < no_of_machine_state; i++){
        transition_state = cycle_advance(i);
        construct_automata(transition_state);
        transition_table[((i*(no_of_insn_classes+1))+no_of_insn_classes)] =
transition_state;
    }
}
generate_output_file(){
// This routine generates the state table in the file. The state table contains all possible
states, and for each state the table has transition state for all instruction classes,
including cycle advance.
}
main(){
    parse_machine_description_file();
    initialize_automata();
    construct_automata(INITIAL_STATE);
    construct_automata_wrapper();
    generate_output_file();
}
```

Where, no_of_machine_states is the total number of distinct machine states. No_of_insn_classes is the total number of machine states read from machine description file. Transtion_table is a single dimensional array of size (no_of insn_classes+1)*no_of machine_state (qne is added because there is one extra instruction class for cycle advance, apart from machine real class). Collision matrix is a collision matrix for any instruction class that is defined as R×L matrix, where R is total number of resources, and L is the maximum latency of any instruction class.

According to an embodiment of the present invention, in the present example, construct_automata_wrapper is written to avoid the degree of recursion and reduce the memory required to construct automata. To avoid possible memory fragmentation, the variable transtion_table can be defined as single dimensional array of size (no_of_insn_classes+1)*no of machine_state. One is added because of one extra instruction class for cycle advance, apart from machine real class. However, the one skilled in the art will appreciate that the variable transition table can be defined using any form known in the art to manage memory fragmentation. For matrix implementation, an array of size of total number of resources available in the target machine is used.

Retargetable Finite State Table Generation:

The finite state automata is target machine independent. The algorithm reads a machine description file for instruction class and resource usage and constructs the collision matrix for all instruction classes. The algorithm outputs a state table that contains possible distinct machine states.

Example of a Machine Description File:

For purposes of illustration, following is an example of a machine description file that can be used according to an embodiment of the present invention. One skilled in the art will appreciate that machine description file can be defined for any target machine using the constraints defined by the target machine.

Initially, the define routine defines the total number of resources, total number of instruction classes, and maximum latency of any instruction class. In the present example, following values are used to illustrate the function of the algorithm however, the values defined here depend on the constraints of the target machine.

```
NO_OF_RESOURCES 2
NO_OF_INSN_CLASSES 2
MAX_LATENCY 3
```

Next, the resource_name is defined. resorce_name defines the name of the resources (i.e., e.g., divide, square root or the like functional units). resource_name:

```
DIV_FU
SQRT_FU
end
```

Next, insn_class_desc is defined. insn_class_desc first defines the name of instruction class, then defines the functional units that are used (e.g., divide, square root or the like), and latency on the functional units. In the present example, DIV_INSN_CLASS, uses DIV_FU for three cycles, and SQRT_FU for one cycle. And, SQURT_FU uses SQURT_FU for 3 cycles, and DIV_FU for one cycle.

```
insn_class_desc:
DIV_INSN_CLASS
{
DIV_FU e000000000000000
SQRT_FU 8000000000000000
}
SQURT_INSN_CLASS
{
SQRT_FU c000000000000000
DIV_FU 8000000000000000
}
end
```

The output state table generated by the algorithm for the present example is given as:

```
#define DIV_INSN_CLASS 0
#define SQURT_INSN_CLASS 1
#define CYCLE_ADVANCE 2
#define NO_OF_STATES 6
int state_table[][] = {{1, 2, 0},
    {-1, -1, 3},
    {-1, -1, 4},
    {-1, -1, 5},
    {-1, -1, 0},
    {-1, -1, 0}
};
```

Heuristic Priority Update

When enough resources are not available to schedule an instruction in the selected region, the priority function for the instruction is updated. Initially, the critical path for the region is identified. Critical path is minimum number of cycles required to schedule the region. Critical path is computed based on dependencies and resources constraints. Dependence graph is a direct acyclic graph (DAG). In DAG, edges are weighted on latency and other machine specific parameters. Critical path is the longest path on this graph. The critical path represents the longest path a region requires for scheduling. A region may not be scheduled in less number of cycles (the distance of the critical path) than what is required for the critical path. The initial estimate of the critical path includes the larger of the dependencies or resource constraints of the critical path.

The critical path is selected based on the longest delay determined by constraints (resource, latency or the like). For each instruction, earliest scheduling time and longest scheduling time is maintained. The number of possible slots an instruction can be scheduled based honoring dependencies and resources constraints is referred to as 'slacks'. For each instruction, earliest scheduling time(ES) and longest scheduling time (LS) is maintained. Slack is defined as the number of all the possible slots an instruction can be scheduled after considering the dependencies and resources constraints for the instruction.

The priority function for a region can be determined using various interacting factors individually or in combination. For example, the critical path can be used to determine the priority function for the selected region (e.g., instruction which is the longest on critical path or the like). In one embodiment of the present invention, An instruction which is longest on the critical path, is given a higher priority. An instruction that has certain predetermined number of 'slacks' (e.g., least number of slacks, most number of slacks or the like) can have predetermined priority (e.g., high, low, no priority or the like). The blocking instructions (e.g., instructions blocking needed resources or the like) can be considered individually or in combination with other factors to determine the priority function. Memory load instructions can be given a predetermined priority. Other factors can be considered individually or in combination thereof to determine the priority function for the selected region.

Integrated Instruction Scheduling and Register Allocation

FIG. 1 illustrates the steps performed during a process of integrated instruction scheduling and register allocation according to an embodiment of the present invention. The process initially selects a region in the code to schedule instructions (105). The process constructs a dependency chart to determine the interdependency of resources between instructions (110). The process then computes the priority functions for the instructions (115). The process determines whether to schedule all the instructions in the selected region (120). If all the instructions require scheduling, the process determines whether to rename deferred registers (125). During instruction scheduling, the process uses virtual registers to resolve resource constraints and defers the naming of physical registers. If the deferred register renaming is not required, the process determines whether the scheduling has completed (135). If the scheduling has not completed, the process proceeds to select the next region of instructions (105).

If the deferred register renaming is required, the process performs partial graph coloring to determine physical registers for instructions (130). The process then determines whether the scheduling has completed (135). If the scheduling has not completed, the process proceeds to select the next region of instructions (105). If all the instructions in the region do not require scheduling, the process determines whether enough registers are available to schedule the instructions. If enough registers are not available, the process heuristically updates the priority functions (145). The process then updates the number of available registers (150). The process proceeds to determine whether enough registers are available (140).

If enough registers are available, the process selects instructions based on the priority functions (step 155). The process then resolves resources constraints using retargetable finite state automata (160). The process schedules the instructions (165). The process then determines whether the scheduling was successful (170). If the scheduling was successful, the process incrementally updates the interference graph (175). The process then updates the available number of registers (180). The process proceeds to determine whether to schedule all the instructions (120).

If the instruction scheduling was not successful, the process determines whether there is false register dependency between the instructions (185). For example, two pipelined instructions may use a common register for computation however the instructions may not depend on data stored in the common register. Because each instruction uses the same common register, traditional code generation may not execute these instructions out of order. An optimized compiler selects one instruction and allocates a different register for computation thus removing register dependency between the two instructions. Each instruction then can be executed independent of each other. If there is no false register dependency, the process proceeds to determine whether enough registers are available to schedule instructions (140).

If there is false register dependency, the process determines whether to use deferred register renaming (190). If deferred register renaming is not required the process renames and reallocates the available registers (195). If deferred renaming is required, the process virtualizes the registers by using available virtual registers (197). The process then proceeds to determine whether to schedule all the instructions (120).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of integrated instruction scheduling and register allocation comprising:
   selecting at least one instruction region; and
   resolving resource constraints for one or more instructions in the instruction region using a finite state machine.

2. The method of claim 1, wherein the instruction region comprises one or more instructions required to be executed.

3. The method of claim 1, further comprising:
   constructing a dependency graph for the instruction region.

4. The method of claim 3, wherein the dependency graph represents dependencies of instructions in the instruction region on one or more resources of a machine.

5. The method of claim 4, wherein one of the machine resources is a physical register of the machine.

6. The method of claim 5, wherein one of the machine resources is a memory operand on the machine.

7. The method of claim 1, further comprising:
   computing one or more priority functions for instructions in the instruction region.

8. The method of claim 7, wherein one of the priority functions is a critical path of the instruction region.

9. The method of claim 8, wherein the critical path reflects a minimum number of cycles required to schedule the instruction region.

10. The method of claim 8, wherein the critical path reflects a minimum number of the machine resources required to schedule the instruction region.

11. The method of claim 7, wherein one of the priority functions is a slack of the instructions in the instruction region.

12. The method of claim 7, wherein one of the priority functions is a predetermined weight assigned to one or more blocking instructions in the instruction region.

13. The method of claim 12, wherein the blocking instructions restrict use of at least one machine resource.

14. The method of claim 7, wherein one of the priority functions is a memory load instruction.

15. The method of claim 1, further comprising:
   determining whether all of the instructions in the instruction region require scheduling.

16. The method of claim 15, further comprising:
   if all of the instructions in the instruction region require scheduling,
   determining whether one or more machine resources require deferred renaming.

17. The method of claim 16, further comprising:
   if one or more of the machine resources require deferred renaming,
   performing partial graph coloring.

18. The method of claim 17, wherein the partial graph coloring generates a partial interference graph.

19. The method of claim 18, wherein the partial interference graph is incrementally built during instruction scheduling.

20. The method of claim 17, wherein the partial interference graph comprises one or more nodes.

21. The method of claim 20, wherein the nodes represents lifetimes of the machine resources.

22. The method of claim 15, further comprising:
   if all of the instructions in the instruction region do not require scheduling, determining whether enough machine resources are available to schedule a first instruction.

23. The method of claim 22, further comprising:
   if enough of the machine resources are not available to schedule one or more of the instructions in the instruction region,
   heuristically updating one or more priority functions for the instructions in the instruction region;
   updating availability of the machine resources;
   and repeating the step of determining.

24. The method of claim 22, further comprising:
   if enough of the machine resources are available to schedule one or more of the instructions in the instruction region,
   selecting a first instruction from the instruction region, and scheduling the first instruction for execution.

25. The method of claim 24, wherein the first instruction is selected based on one or more priority functions.

26. The method of claim 24, further comprising:
   determining whether the scheduling of the first instruction was successful.

27. The method of claim 26, further comprising:
   if the scheduling of the first instruction was successful,
   incrementally updating g dependency graph,
   updating availability of the machine resources, and
   repeating the step of determining whether all of the instructions in the instruction region require scheduling.

28. The method of claim 26, further comprising:
if the scheduling of the first instruction was not successful,
determining whether the first instruction has a false dependency on one or more physical registers.

29. The method of claim 28, wherein the false dependency exists when one or more of the instructions from the instruction region use one of the physical registers as a common register for computation.

30. The method of claim 28, further comprising:
if the first instruction does not have false dependency on one or more of the physical registers,
repeating the step of determining whether all of the instructions in the instruction region require scheduling.

31. The method of claim 28 further comprising:
if the first instruction has false dependency on one or more of the physical registers, determining whether to use deferred renaming for one or more of the physical registers.

32. The method of claim 31, further comprising:
if deferred renaming for one or more of the physical registers is required,
virtualizing one or more of the physical registers,
incrementally updating a dependency graph,
updating availability of the machine resources, and
repeating the step of determining whether all of the instructions in the instruction region require scheduling.

33. The method of claim 32, wherein the virtualizing comprises assigning a memory unit for the one or more of the physical registers.

34. The method of claim 32, wherein the virtualizing is done on a demand basis.

35. The method of claim 32, wherein a partial interference graph is invoked to perform the virtualizing.

36. The method of claim 32, wherein the virtualizing comprises substituting one or more memory locations for the physical registers.

37. The method of claim 32, further comprising:
if deferred renaming for one or more of the physical registers is not required,
renaming one or more of the physical registers of the first instruction,
incrementally updating the dependency graph,
updating availability of the machine resources, and
repeating the step of determining whether all of the instructions in the instruction region require scheduling.

38. The method of claim 37, wherein a partial interference graph is used to determine heuristics to control register allocation.

39. The method of claim 37, wherein one or more priority functions are used to control register allocation.

40. The method of claim 1, further comprising:
changing a machine description table for the finite state machine to make the finite state machine retargetable for one or more target machines.

41. A system for integrated instruction scheduling and register allocation comprising:
means for selecting at least one instruction region; and
means for resolving resource constraints for one or more instructions in the instruction region using a finite state machine.

42. The system of claim 41, wherein the instruction region comprises one or more instructions required to be executed.

43. The system of claim 41, further comprising:
means for constructing a dependency graph for the instruction region.

44. The system of claim 43, wherein the dependency graph represents dependencies of instructions in the instruction region on one or more resources of a machine.

45. The system of claim 44, wherein one of the machine resources is a physical register of the machine.

46. The system of claim 45, wherein one of the machine resources is a memory operand on the machine.

47. The system of claim 41, further comprising:
means for computing one or more priority functions for the instructions in the instruction region.

48. The system of claim 47, wherein one of the priority functions is a critical path of the instruction region.

49. The system of claim 48, wherein the critical path reflects a minimum number of cycles required to schedule the instruction region.

50. The system of claim 48, wherein the critical path reflects a minimum number of the machine resources required to schedule the instruction region.

51. The system of claim 47, wherein one of the priority functions is a slack of the instructions in the instruction region.

52. The system of claim 47, wherein one of the priority functions is a predetermined weight assigned to one or more blocking instructions in the instruction region.

53. The system of claim 52, wherein the blocking instructions restrict use of at least one machine resource.

54. The system of claim 47, wherein one of the priority functions is a memory load instruction.

55. The system of claim 41, further comprising:
means for determining whether all of the instructions in the instruction region require scheduling.

56. The system of claim 55, further comprising:
means for determining whether one or more machine resources require deferred renaming if all of the instructions in the instruction region require scheduling.

57. The system of claim 56, further comprising:
means for performing partial graph coloring if one or more of the machine resources require deferred renaming.

58. The system of claim 57, wherein the partial graph coloring generates a partial interference graph.

59. The system of claim 58, wherein the partial interference graph is incrementally built during instruction scheduling.

60. The system of claim 58, wherein the partial interference graph comprises one or more nodes.

61. The system of claim 60, wherein the nodes represent lifetimes of the machine resources.

62. The system of claim 55, further comprising:
means for determining whether enough machine resources are available to schedule a first instruction if all of the instructions in the instruction region do not require scheduling.

63. The system of claim 62, further comprising:
means for heuristically updating one or more priority functions for the instructions in the instruction region if enough of the machine resources are not available to schedule one or more of the instructions in the instruction region;
means for updating availability of the machine resources if enough of the machine resources are not available to schedule one or more of the instructions in the instruction region; and means for repeating the steps of determining if enough of the machine resources are not available to schedule one or more of the instructions in the instruction region.

64. The system of claim 62, further comprising:
means for selecting the first instruction from the instruction region if enough of the machine resources are available to schedule one or more of the instructions in the instruction region;
and means for scheduling the first instruction for execution if enough of the machine resources are available to schedule one or more of the instructions in the instruction region.

65. The system of claim 64, wherein the first instruction is selected based on one or more priority functions.

66. The system of claim 64, further comprising:
means for determining whether the scheduling of the first instruction was successful.

67. The system of claim 66, further comprising:
means for incrementally updating a dependency graph if the scheduling of the first instruction was successful;
means for updating availability of the machine resources if the scheduling of the first instruction was successful; and
means for repeating the step of determining whether all of the instructions in the instruction region require scheduling if the scheduling of the first instruction was successful.

68. The system of claim 66, further comprising:
means for determining whether the first instruction has false dependency on one or more physical registers if the scheduling of the first instruction was not successful.

69. The system of claim 68, wherein the false dependency exists when one or more of the instructions from the instruction region use one of the physical registers as a common register for computation.

70. The system of claim 68, further comprising:
means for repeating the step of determining whether all of the instructions in the instruction region require scheduling if the first instruction does not have false dependency on one or more of the physical registers.

71. The system of claim 68 further comprising:
means for determining whether to use deferred renaming for one or more of the physical registers if the first instruction has false dependency on one or more of the physical registers.

72. The system of claim 71, further comprising:
means for virtualizing one or more of the physical registers if deferred renaming for one or more of the physical registers is required;
means for incrementally updating a dependency graph if deferred renaming for one or more of the physical registers is required;
means for updating availability of the machine resources if deferred renaming for one or more of the physical registers is required;
and means for repeating the step of determining whether all of the instructions in the instruction region require scheduling.

73. The system of claim 72, wherein the virtualizing comprises assigning a memory unit for the one or more of the physical registers.

74. The system of claim 72, wherein the virtualizing is done on a demand basis.

75. The system of claim 72, wherein a partial interference graph is invoked to perform the virtualizing.

76. The system of claim 72, wherein the virtualizing comprises substituting one or more memory locations for the physical registers.

77. The system of claim 72, further comprising:
means for renaming one or more of the physical registers of the first instruction if deferred renaming for one or more of the physical registers is not required;
means for incrementally updating the dependency graph if deferred renaming for one or more of the physical registers is not required;
means for updating availability of the machine resources if deferred renaming for one or more of the physical registers is not required;
means for repeating the step of determining whether all of the instructions in the instruction region require scheduling.

78. The system of claim 77, wherein a partial interference graph is used to determine heuristics to control register allocation.

79. The system of claim 77, wherein one or more priority functions are used to control register allocation.

80. The system of claim 41, further comprising:
means for changing a machine description table for the finite state machine to make the finite state machine retargetable for one or more target machines.

81. A computer program product for integrated instruction scheduling and register allocation, encoded in computer readable media, the program product comprising:
a set of instructions executable on a computer system, wherein the set of instructions is configured to:
select at least one instruction region; and
resolve resource constraints for one or more instructions in the instruction region using a finite state machine.

82. The computer program product of claim 81, wherein the instruction region comprises one or more instructions required to be executed.

83. The computer program product of claim 81, wherein the set of instructions is further configured to construct a dependency graph for the instruction region.

84. The computer program product of claim 83, wherein the dependency graph represents dependencies of the instructions in the instruction region on one or more resources of a machine.

85. The computer program product of claim 84, wherein one of the machine resources is a physical register of the machine.

86. The computer program product of claim 85, wherein one of the machine resources is a memory operand on the machine.

87. The computer program product of claim 81, wherein the set of instructions is further configured to compute one or more priority functions for instructions in the instruction region.

88. The computer program product of claim 87, wherein one of the priority functions is a critical path of the instruction region.

89. The computer program product of claim 88, wherein the critical path reflects a minimum number of cycles required to schedule the instruction region.

90. The computer program product of claim 88, wherein the critical path reflects a minimum number of machine resources required to schedule the instruction region.

91. The computer program product of claim 87, wherein one of the priority functions is a slack of the instructions in the instruction region.

92. The computer program product of claim 87, wherein one of the priority functions is a predetermined weight assigned to one or more blocking instructions in the instruction region.

93. The computer program product of claim 92, wherein the blocking instructions restriction use of at least one machine resource.

94. The computer program product of claim 87, wherein one of the priority functions is a memory load instruction.

95. The computer program product of claim 81, wherein the set of instructions is further configured to determine whether all of the instructions in the instruction region require scheduling.

96. The computer program product of claim 95, wherein the set of instructions is further configured to, if all instructions in the instruction region require scheduling, determine whether one or more machine resources require deferred renaming.

97. The computer program product of claim 96, wherein the set of instructions is further configured to, if one or more of the machine resources require deferred renaming, perform partial graph coloring.

98. The computer program product of claim 97, wherein the partial graph coloring generates a partial interference graph.

99. The computer program product of claim 98, wherein the partial interference graph is incrementally built during instruction scheduling.

100. The computer program product of claim 98, wherein the partial interference graph comprises one or more nodes.

101. The computer program product of claim 100, wherein the nodes represent lifetimes of the machine resources.

102. The computer program product of claim 95, wherein the set of instructions is further configured to, if all instructions in the instruction region do not require scheduling, determine whether enough machine resources are available to schedule a first instruction.

103. The computer program product of claim 102, wherein the set of instructions is further configured to, if enough of the machine resources are not available to schedule one or more of the instructions in the instruction region, heuristically update one or more priority functions for the instructions in the instruction region; update availability of the machine resources; and repeat the steps of determining.

104. The computer program product of claim 102, wherein the set of instructions is further configured to, if enough of the machine resources are available to schedule one or more instructions in the instruction region, select a first instruction from the instruction region, and schedule the first instruction for execution.

105. The computer program product of claim 104, wherein the first instruction is selected based on one or more priority functions.

106. The computer program product of claim 104, wherein the set of instructions is further configured to determine whether the scheduling of the first instruction was successful.

107. The computer program product of claim 106, wherein the set of instructions is further configured to, if the scheduling of the first instruction was successful, incrementally update a dependency graph, update availability of the machine resources, and repeat the step of determining whether all of the instructions in the instruction region require scheduling.

108. The computer program product of claim 106, wherein the set of instructions is further configured to, if the scheduling of the first instruction was not successful, determine whether the first instruction has false dependency on one or more physical registers.

109. The computer program product of claim 108, wherein the false dependency exists when one or more of the instructions from the instruction region use one of the physical registers as a common register for computation.

110. The computer program product of claim 108, wherein the set of instructions is further configured to, if the first instruction does not have false dependency on one or more of the physical registers, repeat the step of determining whether all of the instructions in the instruction region require scheduling.

111. The computer program product of claim 108, wherein the set of instructions is further configured to, if the first instruction has false dependency on one or more of the physical registers, determine whether to use deferred renaming for one or more of the physical registers.

112. The computer program product of claim 111, wherein the set of instructions is further configured to, if deferred renaming for one or more of the physical registers is required, virtualize one or more of the physical registers, incrementally update a dependency graph, update availability of the machine resources, and repeat the step of determining whether all of the instructions in the instruction region require scheduling.

113. The computer program product of claim 112, wherein the virtualizing comprises assigning a memory unit for the one or more of the physical registers.

114. The computer program product of claim 112, wherein the virtualizing is done on a demand basis.

115. The computer program product of claim 112, wherein a partial interference graph is invoked to perform the virtualizing.

116. The computer program product of claim 112, wherein the virtualizing comprises substituting one or more memory locations for the physical registers.

117. The computer program product of claim 112, wherein the set of instructions is further configured to, if deferred renaming for one or more of the physical registers is not required, rename one or more of the physical registers of the first instruction, incrementally update the dependency graph, update availability of the machine resources, and repeat the step of determining whether all of the instructions in the instruction region require scheduling.

118. The computer program product of claim 117, wherein a partial interference graph is used to determine heuristics to control register allocation.

119. The computer program product of claim 117, wherein one or more priority functions are used to control register allocation.

120. The computer program product of claim 81, wherein the set of instructions is further configured to change a machine description table for the finite state machine to make the finite state machine retargetable for one or more target machines.

* * * * *

UNITED STATES PATENT AND TRADEMARK OFFICE
CERTIFICATE OF CORRECTION

| | | |
|---|---|---|
| PATENT NO. | : 7,007,271 B2 | Page 1 of 1 |
| APPLICATION NO. | : 10/124906 | |
| DATED | : February 28, 2006 | |
| INVENTOR(S) | : Anoop Kumar and Sreekumar Ramakrishnan Nair | |

It is certified that error appears in the above-identified patent and that said Letters Patent is hereby corrected as shown below:

Title Page:
Item [56], References Cited, OTHER PUBLICATIONS, line 10, the word "inmultiple" should read -- in multiple --.

Column 21:
Line 6, the word "restriction" should read -- restrict --.

Line 49, the words "select a" should read -- select the --.

Signed and Sealed this

Fifteenth Day of August, 2006

JON W. DUDAS
*Director of the United States Patent and Trademark Office*